Oct. 20, 1936.  L. WYLIE ET AL  2,057,994
CURRENT COLLECTOR
Filed April 17, 1933   2 Sheets-Sheet 1
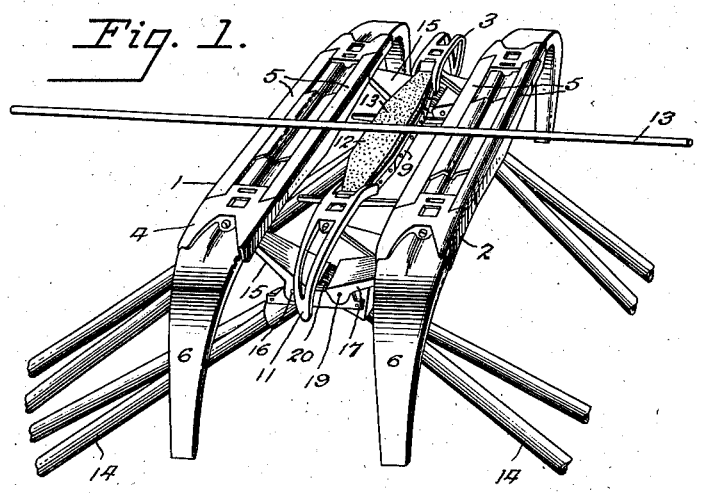
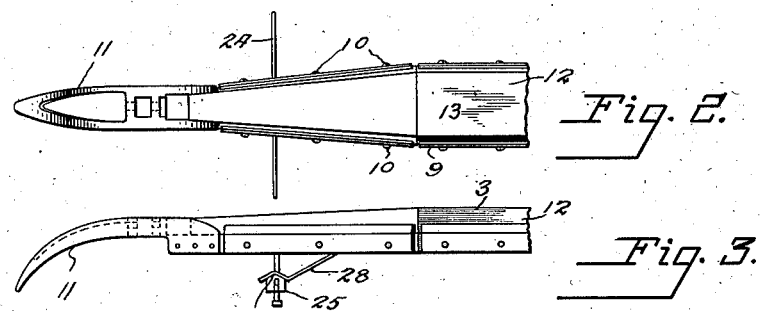
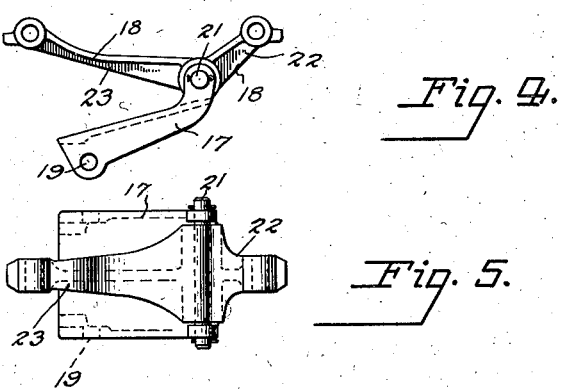
L. Wylie
J. V. Lamson
INVENTORS
BY
ATTORNEY

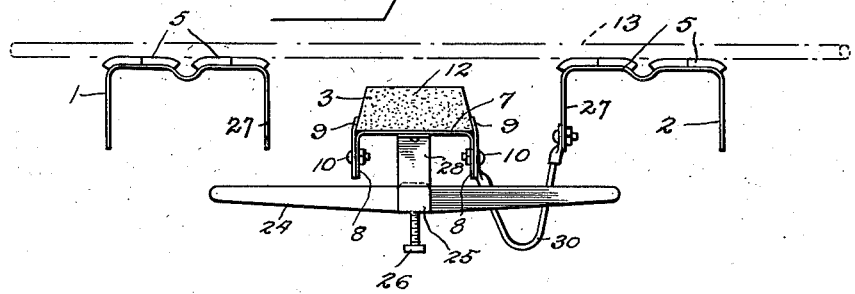
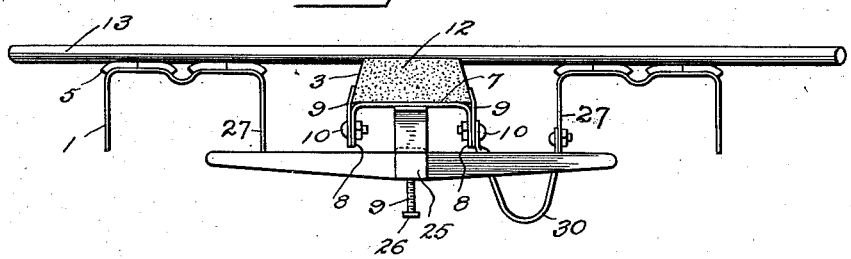
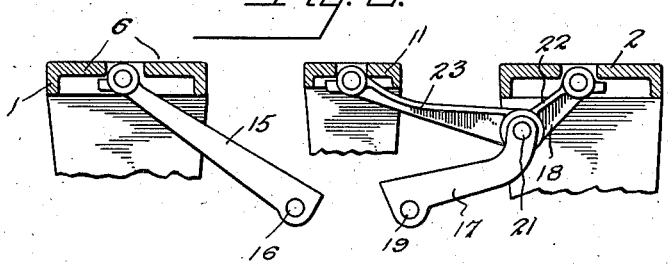

Patented Oct. 20, 1936

2,057,994

UNITED STATES PATENT OFFICE 2,057,994

CURRENT COLLECTOR

Laurence Wylie and Joseph V. Lamson, Seattle, Wash.

Application April 17, 1933, Serial No. 666,583

29 Claims. (Cl. 191—55)

This invention is directed to a means for lubricating the contact surfaces of trolley wires and the cooperating surfaces of the moving current collectors.

The necessary incidental wear of the trolley wire and the contacting portion of the collector shoe or shoes has been long recognized as a highly undesirable source of annoyance and expense, and various attempts have been made to insure adequate lubrication of the contact areas with a view to minimizing as far as possible the friction and thus correspondingly reducing the otherwise resulting wear.

Graphite in one form or another has been recognized as an admirable lubricant for the purpose, but the form of this lubricant which up to the present has provided the main source of lubrication has presented difficulties and disadvantages which, so far as known, have been considered necessary and inescapable evils of the best known method for the desired lubrication. Graphite grease compound was used as a lubricant, which from its very nature was gradually lost from the collector during the run, necessitating renewal at selected periods of time, with the obvious result of apparently fair lubrication immediately following fresh application of the lubricant, with very much reduced lubrication during the intervals between such fresh applications. This lubricant was further objectionable, in that in falling from the collector it accumulated on the roadbed or locomotive and necessitated frequent cleaning, to say nothing of the actual loss from the standpoint of lubricant alone.

The present invention aims to primarily overcome this objection in utilizing a lubricant of a more or less solid character, and while admittedly the attempts to use solid lubricant have been previously made, the difficulty from such use was that the relation between the lubricant and the metal contact surfaces of the collector shoe have been relatively fixed, necessitating that continued proper lubrication of the metal contacting surfaces necessitated the wearing away of these surfaces in more or less compensation with the wearing away of the relatively fixed lubricating surfaces.

The primary object of the present invention, therefore, is the provision of a lubricant carrier, contemplating the use of a solid lubricant, with such lubricant carrier independent of the contact or collector surfaces of the collector shoe and mounted in connection with the collector shoe for compensating independent movement to insure a proper lubricating relation between such contact portions of the shoe and the lubricant carrying element.

A further object of the invention is the provision of means by which the lubricant carrier is supported for independent movement relative to the collector shoe or shoes movable into lubricating position under pressure contact of a collector shoe with the wire.

A further object is the mounting of the lubricant carrier and the collector shoes or shoe to insure that the lubricant element of the lubricant carrier will not be brought into contact with the wire until after the collector shoe or shoes are in engagement with the wire and that on separating the collector as a whole from the wire, the lubricant carrier will first be moved out of contact with the wire, thereby preventing any possibility of burning of the lubricator or damage of its parts due to arcing.

A further object of the invention is to limit the engagement of the lubricant proper with the wire, i. e. to prevent such contact between the lubricant and the wire as to cause the wire to wear a groove of appreciable depth in the lubricant and thereby hold the trolley wire in a more or less fixed path of travel over the collector shoes, with the result of unnecessarily wearing the latter at a particular point, the limiting means being adjustable and serving to permit the operative surfaces of the lubricant proper to be limited in movement toward the wire so as to insure that a proper lubricating contact between the lubricant and the wire will be maintained without permitting the wire to unduly wear the lubricant at any one particular point.

The invention is illustrated in the accompanying drawings, wherein:—

Figure 1 is a perspective view of a conventional pantograph type current collector, illustrating two current collector shoes and a single lubricant carrier.

Figure 2 is a broken plan of the lubricator carrier.

Figure 3 is a side elevation of the same.

Figure 4 is a side elevation of the support for the lubricant carrier.

Figure 5 is a plan view of the same.

Figure 6 is a transverse section through the construction illustrated in Figure 1.

Figure 7 is a view similar to Figure 6, showing the lubricant carrier in spaced relation to the trolley wire, with the collector shoes in contact with the wire.

Figure 8 is a sectional view, partly in elevation, showing the mounting between the collector shoe and lubricant carrier.

The improved construction is here shown as a pantograph type current collector utilizing two current collector shoes 1 and 2 and an intermediate, independent lubricant carrier 3. The collector shoes 1 and 2 are preferably in duplicate, and while any conventional construction is contemplated in this connection, they are illustrated to comprise a frame 4 having removable metallic contact strips 5 with terminal down-curved horns 6.

The lubricant carrier with which the invention is more particularly concerned comprises a metallic box-like frame including a base 7 having depending flanges 8 and side walls 9 which extend down and overlie the flanges 8 and removably secured thereto, as by bolts 10. Secured to the frame thus provided are terminal, downwardly curved horns 11, preferably of skeleton form, the ends of which complete the ends of the box-like frame for receiving the lubricant.

The lubricant proper, indicated at 12, is of solid substance, of which a graphitic cement containing the appropriate or requisite quantity of graphite is an excellent example. The vertical dimension or thickness of the lubricant body is greater than the depth of the box-like frame in which it is secured, with the side walls of the lubricant body upwardly convergent, and the upper portions of the side bars 9 of the box-like body inclined to embrace the inclined side walls of the lubricant body to thereby prevent the latter from movement relative to the frame in which it is placed during its lubricating function. The upper surface of the lubricant body throughout the greater length of such body presents a plane flat area, indicated at 13, and beyond this central portion the surface of the lubricant body preferably inclines downwardly from and into coincidence with the upper plane of the horns to insure proper sliding cooperation with the wire in the use of the collector, as is well understood.

The lubricant body is preferably a solid, inherently self-sustaining mass which, if desired may be cast and molded in place on each lubricant carrier, and further may, if desired, be baked, though obviously the invention contemplates the provision of this lubricant body as a separate article to be removably secured in place on the lubricant carrier and held by the side walls of the box-like frame or through any appropriate means to insure that the carrier and lubricant body, when the latter is in place, is substantially a unit structure.

In order to secure the relative independence in operation of the lubricant carrier with respect to the collector shoe or shoes, it is necessary to provide a particular mounting for such carrier. It will be apparent from the following description that this mounting is designed for cooperation with but one collector shoe, thereby providing for a collector which involves only one collector shoe as well as a collector which involves two such shoes. The pantograph rods 14, or more particularly the upper arms of the pantograph support, are usually connected to the collector shoes through the medium of elements movably connected to the shoes and to the pantograph arms and held under spring tension to insure proper contact between the contact strips of the shoes and the wire. This conventional mounting is utilized in the present instance in connection with that collector shoe, where two such shoes are used, which is not utilized to control the movement of the lubricant carrier. Thus, the independent collector shoe, that shown for example at 1, is movably connected to the upper end of arms 15 which are movably connected at their lower ends at 16 to the heads of the pantograph rods 14, a coil spring at the connection serving to maintain the arm under upward swinging tension to secure the desired pressure connection between the collector shoe proper and the trolley wire.

The remaining collector shoe, as 2, is connected to the heads of the pantograph rods 14 through the medium of an arm 17 and the lever 18. The arm is pivotally connected at its lower end at 19 to the heads of the pantograph rods and influenced in the usual manner by a coil spring 20. This arm 17 is similar to but of less length than the arm 15 and pivotally supports at its upper end at 21 the lever 18. This lever is of an angle type having a short arm 22 which is pivotally connected to the collector shoe 2, and a longer arm 23 which is pivotally connected to the box frame of the lubricant carrier or, as illustrated, pivotally connected to the horn extension of such lubricant carrier. It is understood that in the conventional pantograph, the upper arms 14 are in duplicate for each collector shoe, and hence the connections described are in duplicate.

From the described connection between the selected collector shoe and the lubricant carrier, it will be apparent that the tendency of the spring 20 is to move the lever 17 upwardly and thus compel pressure contact between the collector shoe 2 and the wire 13, and that under this pressure contact which is communicated through the lever 18 to the lubricant carrier, said lubricant carrier will also be brought into pressure contact with the trolley wire.

If the lubricant carrier is permitted relatively free upward movement toward the trolley wire under the connection described, it is possible that the trolley wire might, under certain adverse conditions of operation, wear a groove of appreciable depth in the relatively soft material of the lubricant body. If this should be permitted, the trolley wire and collector shoes would be substantially fixed against any relatively free lateral movement, and hence the wire would wear a corresponding groove or channel in the conducting strips of the collector shoes. This is, of course, a decided disadvantage, for if permitted, would soon cut through the conducting strips or at least form a channel therein of such depth as to prevent free lateral movement of the shoes relative to the wire which would eventually destroy the utility of the structure.

It is, therefore, of importance to limit the relative upward movement of the lubricant carrier with respect to the collector shoes and, of course, owing to the necessity for compensating for wear in the lubricant body, this limiting means should preferably be capable of adjustment. The limiting means includes bars 24 duplicated adjacent the respective ends of the lubricant carrier and centrally formed with an enlargement 25 having a threaded opening to cooperate with a threaded bolt or stem 26 secured to and depending from the lubricant carrier. The limit bars 24 are designed, when in operative position, to project transversely of the lubricant carrier, with the free ends of the bars underlying and projecting beyond the depending side walls 27 of the collector shoes.

The bars are secured against turning from an operative position by leaf springs 28 secured to the lubricant carrier and having their free ends overlying and bearing upon the upper ends of the enlarged portions 25 of the limit bars. The upper portion of the enlargement 25 of each limit bar is preferably of angular form, as at 29, and the terminals of the springs 28 are correspondingly formed to interfit, thus preventing the limit bars from turning. The terminals of the springs are, of course, longitudinally slotted to pass over the threaded bolts 26.

From the construction described, it will be apparent that with the limit bars set a predetermined distance below the lubricant carrier, such carrier and, therefore, the upper operative surface of the lubricant body, is limited in relative vertical movement to a position in which the free ends of the limit bars will contact with the lower edges of the side walls 27 of the collector shoes. The lubricant carrier cannot move upwardly beyond this limit position and, therefore, the limit bars provide a means by which the desired contact between the lubricant body and the trolley wire may be predetermined, limited and controlled. Ordinarily, this is limited so that the upper surface of the lubricant body, when not restrained, is permitted to move to a small fraction of an inch above the contact plane of the wire and collector shoes, thereby preventing the possibility of the formation in the lubricant body of a groove or grooves of a depth which would interfere with the relatively free lateral play of the collector as a whole with respect to the wire.

Obviously, by merely lifting the free ends of the springs 28, the limit shoes may be turned on the threaded bolts 26 and vertically adjusted with respect to the lubricant carrier and thereby providing for accurate initial adjustment and also providing for adjustment to compensate for normal wear of the lubricant body in use. It will be apparent that the lubricant body and also the lubricant carrier is, generally speaking, a fair conductor of electricity so that the parts will carry some current. Ordinarily this current will be a relatively small portion of the total amount collected, but under certain conditions the current might be sufficient to fuse and stick some parts of the supporting mechanism.

In order, therefore, to protect the supporting mechanism from sparking at the joints, a more or less flexible connector 30 is terminally connected to one of the collector shoes and to the metallic frame of the lubricant carrier. This flexible connector serves to protect the bearings of the lubricant carrier and the supporting mechanism from the destructive effects of stray currents, and while it is preferred to protect the parts in the manner described, it is apparent that, if desired, the lubricant carrier may be thoroughly and completely insulated in any one of a number of obvious manners from the collector shoe and any such conventional and desired insulation, provided the flexible connector is not used, is contemplated as within the spirit of this invention, the insulating means which can or may be employed being well understood and entirely conventional and not requiring illustration or specific description.

It is noted that the relative proportions of the lengths of the lever 18 is such that under an appropriate distribution of the weights and proportions that when the collector as a whole is free of contact from the trolley wire, the lubricant carrier will be normally on a plane below that of the collector shoe with which it is connected.

As this collector shoe is brought into contact with the trolley wire, the pressure of such contact incident to the spring 20 will naturally raise the lubricant carrier until the upper surface of the body of the lubricant is also brought into contact with the wire.

When the pantograph is lowered, the release of the bearing pressure, or more particularly the reduction in that pressure, tends to a corresponding reduction on the pressure of the short end 22 of the lever 18, and thus as this pressure is gradually reduced, the longer end of the lever is permitted to move downwardly until just previous to the separation of the collector shoe and trolley wire, the upper surface of the lubricant body is wholly free of contact with the trolley wire. This sequence of relative operation of the lubricant carrier and the collector shoe prevents any possibility of burning the lubricant or the lubricant carrier due to arcing under circuiting conditions, and it is equally obvious that when the pantograph is raised, the lubricant body will not come in contact with the trolley wire until after the collector shoe has made contact. Thus, the possibility of damage due to collecting or arcing of heavy current incident to contact of the lubricant body with the trolley wire before the collector shoe makes such contact, or in breaking contact between the collector shoe and wire before contact is broken between the wire and the body of lubricant, is entirely avoided.

The lubricant employed in the present invention is preferably a graphite cement, with the proportion of graphite relatively large and the remaining constituents of the cement presenting in the completed article the characteristics of hardness, toughness, lack of shrinkage, and resistance to moisture.

The possibility of adjustment of the vertical travel limit of the lubricator carrier is particularly important in order to avoid undue grooving of the lubricant body by the wire, with the result of holding the collector as a whole in one fixed path of travel with respect to the wire. Of course, as the solid lubricant is worn away in use, the vertical limit of movement of the lubricant carrier is adjusted to compensate for this wear, thus insuring proper lubrication of the wire under all conditions.

The lubricating means described presents features of material importance in devices of this character. For example, there is complete elimination of any oil or grease content, elimination of necessity of frequent application of the lubricant, effective lubrication throughout the entire distance run, elimination of grease displacement and consequent fouling of the engine and other parts and, most importantly, the lubrication maintains a uniform lubricating effect with utmost economy for the reason that the lubricant body is only worn in contact with the actual contact surface of the trolley wire. The hard smooth surface of the lubricant body will not collect sand and grit, and further tends to a smoothing and polishing action of the wire without the application of an oily or greasy film which might present an undesirable insulating effect. The contact surfaces thus maintained smooth and clean are, therefore, brought into more intimate contact than would otherwise be possible, whereby any tendency toward sparking at the contacts is materially reduced.

The invention may be utilized in connection with any current collector designed to pass over a conductor for the purpose of transmitting current therefrom to any point of use, and no limitation is intended herein by the showing and description of the invention as applied to the conventional trolley current collector.

When this type of collector equipment is operated under trolley wires, the solid lubricator strip rubs lightly against the contact surface of the wire or wires, applying the lubricant as needed, very sparsely on a smooth surface and plentifully on a rough surface. Rough surfaces are coated with a film of lubricant and are made smooth in a very short time. As the solid lubricant wears away with use, the limit of vertical travel may be readily adjusted with the stop, thus making available a fresh supply of lubricant.

The smoothing and polishing action of the solid lubricant is accomplished without the application of an oily or greasy film of lubrication which would act as an undesirable insulator on and between the contact surfaces. The smooth clean contact surfaces are, therefore, brought into more intimate contact than would otherwise be possible, with the result that any tendency toward sparking at the contacts is greatly reduced, with the consequent reduction of interference to radio and wire communication services, and to control circuits.

Another important result gained by the improved structure is the added safety afforded by the use of solid lubricant. There have been several instances where workmen have been electrocuted while applying grease lubricant to pantograph shoes with the locomotive standing under the trolley wire. With the use of solid lubricant, this practice can be eliminated and the attendant hazards avoided.

Having thus described the invention, what is claimed as new, is:—

1. A collector shoe for moving contact with a charged conductor, trolley wire lubricating means carried by and movable relative to such shoe, and adjustable means to limit such movement in one direction.

2. A current collector including spaced collector shoes, a lubricant carrier arranged between the shoes, and means for connecting said carrier to one of the shoes, said means compelling relative opposite unequal movements of the shoe and lubricant carried.

3. A current collector including spaced collector shoes, a lubricant carrier arranged between the shoes, lever connection between the carrier and one of the shoes to permit relative movement of the carrier toward and from the operative plane of the shoes, and means carried by the carrier and cooperating with the shoes to limit relative movement of the carrier toward such operative plane of the shoes.

4. A current collector including a collector shoe, a lubricant carrier, a lever connecting such shoe and carrier, and a limit bar adjustably secured to the carrier to engage the shoe and limit lever movement of the carrier in one direction.

5. A current collector including spaced collector shoes, a lubricant carrier arranged between the shoes, a lever connecting such carrier and one of the shoes, and a limit bar adjustably secured to the carrier and engaging with the shoes to limit movement of the carrier in one direction.

6. In combination, a current collector having collector shoes adapted for engagement with a trolley wire, a lubricant carrier adapted for engagement with the trolley wire and movably mounted between the shoes, and connections between one of the shoes and said carrier, said connections moving the carrier in the movement of one of the shoes with a rate movement varying from that of the shoes.

7. A collector shoe adapted for engagement with a trolley wire, a lubricant carrier adapted for engagement with the trolley wire and mounted in substantial parallelism with the shoe, and a connection between the shoe and carrier and mounted to move the carrier in response to and in opposition with the movement of the shoe, said connection moving with the carrier to a distance in excess of the movement of the shoe.

8. A collector shoe adapted for engagement with a trolley wire, a lubricant carrier adapted for engagement with the trolley wire and mounted in substantially spaced relation to the shoe, and a connection between the shoe and carrier, said connection compelling the carrier to move in a direction reverse to the movement of the shoe toward and from operative position, the movement of the carrier in both directions being in excess of the similar movement of the shoe.

9. A current collector including spaced collector shoes adapted for engagement with a trolley wire, a lubricant carrier adapted for engagement with the trolley wire and arranged intermediate the shoes, and levers connected to the carrier and one of the shoes to compel carrier movement as a result of the movement of the shoe to which the levers are connected.

10. A current collector including spaced collector shoes adapted for engagement with a trolley wire, a lubricant carrier adapted for engagement with the trolley wire and arranged intermediate the shoes, and levers connected to the carrier and one of the shoes to compel carrier movement as a result of the movement of the shoe to which the levers are connected, said levers being mounted to relatively increase the carrier movement with respect to the controlling movement of the shoe.

11. A collector shoe having an operative position in contact with a trolley wire or the like, a lubricant carrier, a mass of lubricant on the carrier having an operative position in contact with the trolley wire for the lubrication of the wire during the contact of the shoe therewith, and means mounted for swinging movement and providing the sole support for the shoe and carrier in relatively opposite directions beyond the pivotal mounting, said means maintaining the carrier below the shoe when the shoe is in other than operative position, said means operating to move the carrier into operative position with respect to the wire following contact of the shoe with the wire, said means operating on release of contact pressure between the shoe and wire to move the carrier from operative position with respect to the wire prior to the separation of the shoe and wire.

12. A current collector including a connector shoe mounted for operative pressure contact with a trolley wire or the like, a lubricant carrier including a mass of lubricant and arranged for operative contact with the trolley wire for lubrication purposes, and a member pivotally supported intermediate its ends and terminally connected to and supporting the shoe and carrier, said member normally maintaining the carrier below the wire-engaging surface of the shoe, said member acting under normal contact pressure between the shoe and wire to move the carrier to an operative position with respect to the wire and compelling movement of the carrier out of contact with the wire in any movement of the shoe tending to reduce its normal pressure contact with the wire, whereby in positioning the current collector with respect to the wire the contact of the lubricant on the carrier with the wire is compelled to follow the contact between the shoe and wire, and on the removal of the current collector from the wire, the lubricant carrier is compelled to move free of contact with the wire before the shoe is moved free of such wire contact.

13. A current collector including a collector shoe, a lubricant carrier having a normal inoperative position below the wire-engaging plane of the shoe, and means connecting the shoe and carrier to move the shoe toward and from a plane substantially coincident with the wire-engaging plane of the carrier in the movement of the shoe into and out of contact with a trolley wire, the movement of the carrier being in excess of the similar movement of the shoe.

14. In a current collector, a collector shoe adapted for engagement with a trolley wire, a lubricant carrier adapted for engagement with the trolley wire, and levers connecting the carrier and shoe, said levers being mounted for pivotal movement to provide short arms and long arms, the long arms being connected to the carrier and the short arms connected to the shoe, whereby the relative movements of the shoe and carrier vary in distance in any movement of the levers.

15. A current collector designed for cooperation with a trolley wire or the like, including a collector shoe designed to have an operative pressure contact with the wire, a lubricant carrier normally disposed below the wire-engaging plane of the shoe, means connecting the shoe and carrier to move the carrier into the wire-engaging plane of the shoe following contact between the shoe and wire, and means to limit the movement of the carrier toward the wire-engaging plane of the shoe.

16. A current collector designed for cooperation with a trolley wire or the like, including a collector shoe designed to have an operative pressure contact with the wire, a lubricant carrier normally disposed below the wire-engaging plane of the shoe, means connecting the shoe and carrier to move the carrier into the wire-engaging plane of the shoe following contact between the shoe and wire, and means to limit the movement of the carrier toward the wire-engaging plane of the shoe, said means being adjustably mounted with respect to the carrier.

17. In a current collector, a current collector shoe adapted for engagement with a trolley wire, a lubricating member adapted for engagement with the trolley wire and maintained constantly in position by the collector shoe and with an operative pressure less and directly proportional to the operative pressure of the collector shoe.

18. In a current collector, a collector shoe adapted for engagement with a trolley wire, a lubricating member adapted for engagement with the trolley wire and connected to and movable with respect to the shoe, the contact pressure of the shoe in operative position maintaining a proportionally constant but diminished operative pressure of the lubricating member.

19. A current collector including a current collector shoe, a lubricating member carried by and movable relative to such shoe, the operative pressure of the shoe against the conductor maintaining the lubricating member in constant contact with the conductor with a pressure less than but constantly proportional to the pressure of the shoe against the conductor, and means for limiting the movement of the lubricating member in the operative direction.

20. A pantograph, a lever pivotally supported relative to the pantograph and having a short arm and a long arm, a current collector shoe adapted for engagement with a trolley wire and carried by the short arm of the lever, and a lubricating member adapted for engagement with the trolley wire and carried by the long arm of the lever.

21. A pantograph, a lever pivotally connected to the pantograph and having arms of different lengths, a collector shoe adapted for engagement with a trolley wire and connected to one of said arms, a lubricating carrier adapted for engagement with the trolley wire and connected to the other of said arms, and a solid lubricant in said carrier.

22. A pantograph including a spring-pressed arm, a lever pivotally supported at the upper end of the arm, said lever including a short arm and a long arm, a collector shoe adapted for engagement with a trolley wire and carried by the short arm of the lever, a lubricant carrier adapted for engagement with the trolley wire and connected to the long arm of the lever, and a body of solid lubricant in the carrier.

23. A pantograph, two levers pivotally supported intermediate their ends in spaced relation by the pantograph, a collector shoe adapted for engagement with a trolley wire and connected to the similar arms of both levers, and a lubricant carrier adapted for engagement with the trolley wire and connected to the remaining arms of both levers.

24. In a current collector, a current collector shoe adapted for engagement with a trolley wire, a lubricating member adapted for engagement with the trolley wire and maintained constantly in position by the collector shoe and with an operative pressure varying from and directly proportional to the operative pressure of the collector shoe.

25. A current collector including spaced collector shoes, a lubricant carrier arranged between the shoes, means for connecting the carrier to one of the shoes, said means forming the sole support for the carrier and operating to compel relatively opposite movement of the shoe and carrier to insure that under contact between the shoe and trolley wire the carrier will, following such contact of the shoe, be moved into contact with the trolley wire, said means under any movement of the shoe compelling an increased movement of the carrier.

26. A current collector including spaced collector shoes, a lubricant carrier arranged between the shoes, and a lever connecting the carrier and one of the shoes and forming a sole support for the carrier, said lever being mounted for pivotal movement intermediate the shoe and carrier and compelling movement of the carrier in excess of the movement of the shoe.

27. In a trolley, a vertically movable support, a pair of spaced contact shoes yieldingly mounted on the support, and a lubricating shoe yieldingly mounted on the support between the contact shoes, its engaging face being non-metallic, all of the named shoes being engageable with a conductor.

28. In a pantograph trolley, in combination, an extensible support, a pair of contact shoes yieldingly carried by the support and mounted to engage the trolley wire transversely, a lubricating shoe for engaging the trolley wire mounted between and spaced from the contact shoes, and levers pivotally carried by the extensible support intermediate their ends and connected at similar ends to one of the contact shoes and at opposite ends connected to and forming the sole support for the lubricating shoe, the contact shoes being normally in advance of the lubricating shoe when the shoes are out of contact with the conductor.

29. In a pantograph trolley, an extensible frame, a pair of spring-advanced collecting shoes and a lubricating shoe located between the pair of collecting shoes and carrying a semi-solid lubricant, lever elements pivotally supported by the frame and having short arms and long arms, the short arms being connected to one of the collecting shoes, the long arms being connected to and forming the support for the lubricating shoe, the collecting shoes being normally in advance of the lubricating shoe when the shoes are out of contact with the conductor, all of the named shoes being engageable with the conductor.

LAURENCE WYLIE.
JOSEPH V. LAMSON.